No. 739,239. PATENTED SEPT. 15, 1903.
S. WACHTL.
PHOTOGRAPHIC APPARATUS.
APPLICATION FILED APR. 9, 1900.
NO MODEL.
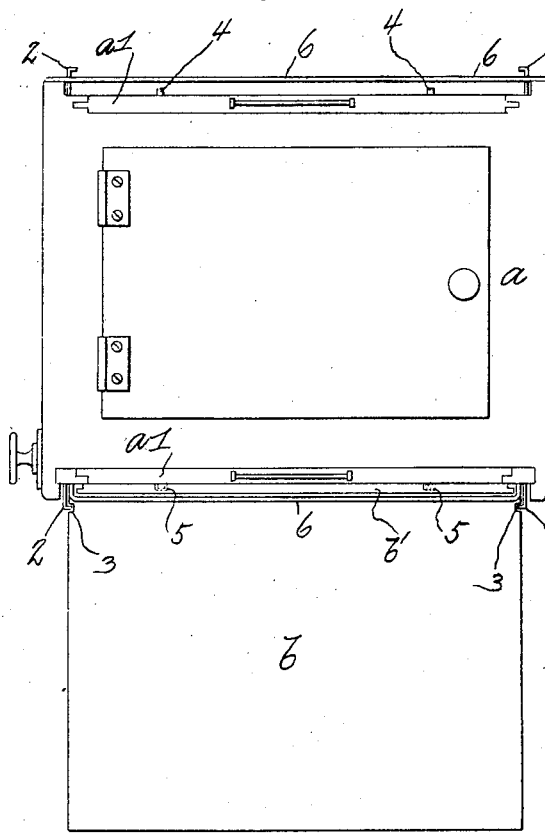
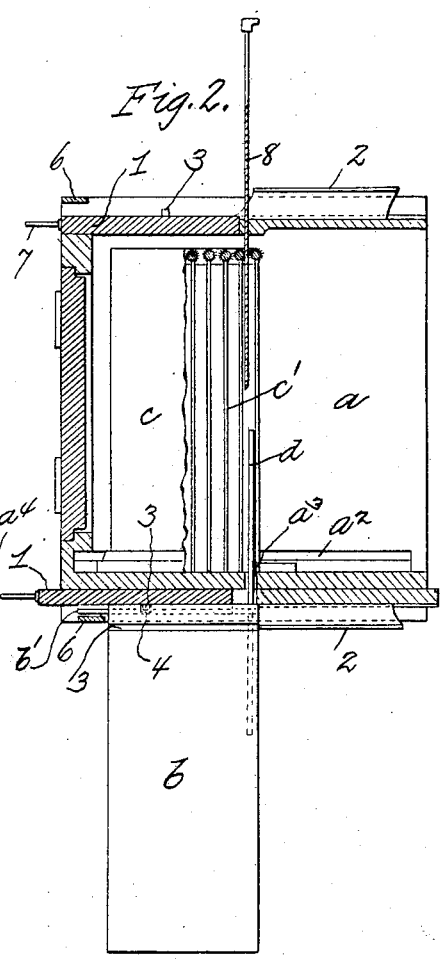
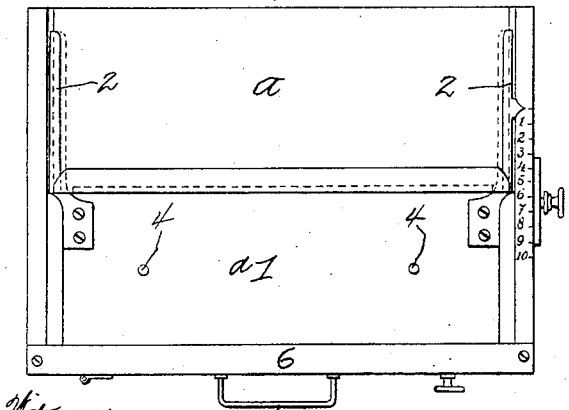

No. 739,239. Patented September 15, 1903.

UNITED STATES PATENT OFFICE.

SIEGFRIED WACHTL, OF VIENNA, AUSTRIA-HUNGARY, ASSIGNOR TO LUDWIG HERZ, OF VIENNA, AUSTRIA-HUNGARY.

PHOTOGRAPHIC APPARATUS.

SPECIFICATION forming part of Letters Patent No. 739,239, dated September 15, 1903.

Application filed April 9, 1900. Serial No. 12,197. (No model.)

*To all whom it may concern:*

Be it known that I, SIEGFRIED WACHTL, a subject of the Emperor of Austria-Hungary, residing at Vienna, in the Province of Lower Austria, in the Empire of Austria-Hungary, have invented certain new and useful Improvements in Photographic Apparatus; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention relates to improvements in photographic cameras; and it has for its object to provide means for the insertion and removal of sensitized plates in such manner that in the transfer the plates can pass into and out of the camera without danger of being accidentally exposed.

The invention consists in providing a magazine adapted to be secured to the top of the camera for the purpose of loading the camera with unexposed plates and then securing the same magazine to the bottom thereof for the purpose of receiving the plates after exposure.

The invention further consists in the construction, combination, and arrangement of parts, as is hereinafter described and claimed.

The invention is fully and clearly illustrated in the accompanying drawings, in which—

Figure 1 is a rear elevation of a camera having a magazine secured in position to receive the plates after exposure. Fig. 2 is a longitudinal vertical section through the camera, the magazine being shown in side elevation. Fig. 3 is a top plan view.

The camera comprises a rectangular box $a$ of any suitable interior construction, with openings in the top and bottom, said openings adapted to be closed by means of slide $a'$, mounted to slide in the side walls of the camera. On both sides near the top and bottom openings or on the slides themselves are mounted suitable L-shaped rails 2, forming tracks, on which is mounted to slide a magazine $b$, having longitudinal slots 3 formed in the side walls thereof near the edge into which said rails fit and hold the magazine in position. The outer face of each slide $a'$ is provided with lugs or projections 4 for the purpose of engaging recesses 5, formed in the outer face of a slide $b'$, designed to close the open end of the magazine $b$.

A ledge 6, mounted transversely across the rear end of the camera both at the top and bottom, prevents the magazine when in place on the rails from being drawn from the rear end of the camera by the manipulation of the slides $a'$ and $b'$ when they are locked together, as above described.

The interior of the camera $a$ is provided with any well-known form of plate-holder $c$, preferably mounted on pinions running on racks $a^2$, secured to the bottom of the camera, said holder being manipulated from the outside through the agency of a milled screw $a^4$, secured to one of said pinions. When it is desired to load the camera, the magazine $b$ (having previously been filled with sensitized plates) is inverted and slid onto the top rails 2 from the front of the camera until it abuts against the ledge 6, the rails 2 taking into the slots 3, and the lugs 4 on the slide $a'$ taking into the recesses 5 on the slide $b'$, which latter slide now serves as the bottom of the magazine, the slide or cover $a'$, being over the opening in the top, entirely closing the same, and the lens also being covered, making the camera dark. The slide $a'$ is now withdrawn by means of a handle 7. The slide or bottom $b'$ of the magazine being locked to said slide $a'$, as described, is also slid back sufficiently to allow the unexposed plates to fall one by one into the several grooves $c'$ of the plate-holder $c$. After all the plates have been dropped the slide $a'$ is returned for the purpose of closing the camera. The magazine $b$ is then removed from the top and connected to the bottom of the camera in the same manner as above described, the slide $b'$ now becoming the top of the magazine. As is well known, before exposure a shutter 8 is slid through a suitable slot in the top of the camera and placed behind the foremost plate for the purpose of shielding the remaining ones from exposure, and after each plate has been exposed the slide or bottom $a'$ is withdrawn, which also withdraws the slide or cover $b'$ of the magazine sufficiently to permit the exposed plate $d$ to drop by gravity into the magazine through an aperture $a^3$, formed in the bottom of the camera, as shown in Fig. 2 of the drawings. The next plate may then be moved into position by moving the plate-holder $c$ forward.

What I claim is—

1. The combination with a camera-box, having a sliding top and bottom, of a magazine adapted to be secured on said box, a slide to close said magazine and adapted to be locked to the top and bottom and moved therewith, for the purpose specified.

2. The combination with a camera-box and a plate-holder therein, and a slide in the top of the camera; of a transfer-magazine, a slide arranged to be locked to the sliding top and withdrawn by the same, a bottom in the camera provided with a discharging-slot, a slide normally covering said slot and organized to engage the slide of the transfer-magazine, and means for securing said magazine to the camera, substantially as set forth.

3. The combination with a camera-box and a plate-holder movable therein; of a fixed bottom for said camera-box provided with a slot, a slide slidable below it and a transfer-magazine provided with a slide and capable of being removably held to the camera-box below the slot, said slide arranged to engage the slide of the transfer-magazine and uncover the slot to allow the plates to successively drop from the holder in the camera through the slot into the transfer-magazine, substantially as set forth.

4. The combination with a camera, a slide in the top thereof; of a fixed bottom provided with a slot, a second slide to cover said slot, a plate-holder movable within the camera, a transfer-magazine, a slide therefor arranged to be secured to the top of the camera, the slide of said magazine organized to be locked to the slide in the camera-top, whereby plates can be successively loaded in the camera, angular slideways secured to the camera-bottom to hold the magazine slidably thereto, means for interlocking the slide in the camera-bottom and the magazine-slide, whereby exposed plates can be successively delivered through the slot in the camera-bottom into the magazine, substantially as described.

In testimony that I claim the foregoing as my invention I have signed my name in presence of two subscribing witnesses.

SIEGFRIED WACHTL.

Witnesses:
JOSEF RUBRESCH,
ALVESTO S. HOGUE.